(12) United States Patent
Lee et al.

(10) Patent No.: US 9,674,690 B2
(45) Date of Patent: Jun. 6, 2017

(54) METHOD FOR CONTROL AND ENFORCEMENT OF POLICY RULE AND EUICC

(71) Applicant: KT CORPORATION, Seongnam-si (KR)

(72) Inventors: Hyung Jin Lee, Seoul (KR); Youn Pil Jeung, Seoul (KR); Sung Chul Kim, Seoul (KR)

(73) Assignee: KT CORPORATION, Seongnam-si (KR)

( * ) Notice: Subject to any disclaimer, the term of this patent is extended or adjusted under 35 U.S.C. 154(b) by 57 days.

(21) Appl. No.: 14/403,076

(22) PCT Filed: May 23, 2013

(86) PCT No.: PCT/KR2013/004527
§ 371 (c)(1),
(2) Date: Nov. 21, 2014

(87) PCT Pub. No.: WO2013/176499
PCT Pub. Date: Nov. 28, 2013

(65) Prior Publication Data
US 2015/0110035 A1    Apr. 23, 2015

(30) Foreign Application Priority Data

May 23, 2012 (KR) .................. 10-2012-0054822
Dec. 3, 2012 (KR) .................. 10-2012-0138949

(51) Int. Cl.
*H04W 4/00* (2009.01)
*H04W 8/18* (2009.01)
*H04W 12/08* (2009.01)

(52) U.S. Cl.
CPC ........... *H04W 8/183* (2013.01); *H04W 12/08* (2013.01)

(58) Field of Classification Search
None
See application file for complete search history.

(56) References Cited

U.S. PATENT DOCUMENTS

| 2009/0191857 A1 | 7/2009 | Horn et al. |
| 2011/0003580 A1 | 1/2011 | Belrose et al. |
| 2011/0158090 A1* | 6/2011 | Riley .............. H04L 12/14 370/230 |

(Continued)

OTHER PUBLICATIONS

Denis Praca, "Embedded UICC challenges and standardization status", Sep. 21-23, 2011, pp. 4-22, http://www.smart-event.eu/11/proceedings/e-smart/gemalto_embedded_denis_praca.pdf.

(Continued)

*Primary Examiner* — Chi H Pham
*Assistant Examiner* — Fahmida Chowdhury
(74) *Attorney, Agent, or Firm* — Sughrue Mion, PLLC

(57) ABSTRACT

The present invention relates to a method for the control and enforcement of a policy rule in eUICC. The present invention relates to a method for the control and enforcement of a policy rule and to an eUICC, the method providing a function of controlling (defining, setting, updating, etc.) the policy rule for profiles on the eUICC according to the requirement of a business operator or a service provider, and providing a function of enforcing such as activating, deactivating, loading or deleting the profiles based on the thus-controlled policy rule.

19 Claims, 10 Drawing Sheets

(56) References Cited

U.S. PATENT DOCUMENTS

| | | | | |
|---|---|---|---|---|
| 2012/0289197 A1* | 11/2012 | Holtmanns | ........... | H04W 8/183 455/411 |
| 2013/0122864 A1* | 5/2013 | Haggerty | .............. | H04L 63/105 455/411 |
| 2013/0152159 A1* | 6/2013 | Holtmanns | ............. | G06F 21/00 726/1 |
| 2013/0231087 A1* | 9/2013 | O'Leary | ................. | H04W 8/22 455/411 |

OTHER PUBLICATIONS

GSM Association, "Embedded SIM task force requirements and use cases 1.0", Feb. 21, 2011, pp. 4-36, ftp://ftp.3gpp2.org/TSGS/Working/_2011/201 1-0505-TSG-S+TSG-C_re_eUICC/Embedded SIM Use Cases and Reqts v10.pdf.

Luis Barriga et al., M2M Remote-Subscription Management, Ericsson Review 2011, 6 pgs., http://www.ericsson.com/res/thecompany/docs/publications/ericsson_review/2011/m2m_remotesubscriptions.pdf.

International Search Report for PCT/KR2013/004527 dated Oct. 22, 2013.

* cited by examiner

METHOD FOR CONTROL AND ENFORCEMENT OF POLICY RULE AND EUICC

CROSS-REFERENCE TO RELATED APPLICATIONS

This application claims priority from Korean Patent Application No. 10-2012-0054822 filed on May 23, 2012 in the Korean Intellectual Property Office and Korean Patent Application No. 10-2012-0138949 filed on Dec. 3, 2012 in the Korean Intellectual Property Office, the contents of which are hereby incorporated by reference in their entireties.

BACKGROUND

1. Technical Field

Methods and apparatuses consistent with the exemplary embodiments relate to a method of controlling (defining, updating, deleting, and the like) and enforcing policy rules in an embedded universal integrated circuit card (eUICC) and an eUICC.

2. Related Art

In an existing detachable universal subscriber identity module (USIM) environment, the content for policy rules of all business operators and a service provider is usually managed only by a server. These policy rules are controlled and enforced in the server.

In a related art method of controlling and applying all policy rules in the server in a scheme in the existing detachable USIM environment, issues can arise due to differences in a server architecture of an embedded USIM (eSIM) and an opening process of the eSIM and business requirements of various interested parties.

Therefore, a method of defining the content and structure of policy rules on the eSIM to apply the policy rules is needed. Specifically, user cases for managing profiles and the eSIM through the policies on the eSIM are needed.

SUMMARY

Accordingly, exemplary embodiments are provided to address one or more problems due to limitations and disadvantages of the related art.

Exemplary embodiments provide a method of defining the content and structure of policy rules to apply the policy rules and provide users with cases for managing profiles and an eSIM through the policies on the eSIM according to the defined content and structure.

More specifically, exemplary embodiments provide a function of controlling the policy rules for profiles on the eSIM according to requirements of a business operator/service provider and an enforcement function of enabling, disabling, loading, and/or deleting the profiles based on the policy rules controlled in this manner.

Exemplary embodiments also provide an enforcement function of enabling, disabling, loading, and/or deleting the profiles according to the policy rules based on capabilities on the eSIM.

Exemplary embodiments also provide an enforcement function of locking profiles on the eSIM based on a lock-related policy rule according to requirements of the business operator and/or service provider.

In some exemplary embodiments, an eUICC for controlling and enforcing policy rules includes: a policy rule storage configured to define actions and conditions required to enforce a plurality of policies and store a plurality of policy rules including a plurality of policy rules for each profile and a plurality of policy rules for the eUICC; a policy controller configured to control the plurality of policy rules; and a policy enforcer configured to enforce the policy rules.

In other exemplary embodiments, a method of controlling and enforcing policy rules on an eUICC includes: defining, by the eUICC, actions and conditions in order to enforce policies and storing policy rules including policy rules for each profile and policy rules for the eUICC; setting, by the eUICC, the policy rules through a policy control function (PCF); and enforcing, by the eUICC, the set policy rules through a policy enforcement function (PEF).

In still other exemplary embodiments, a method of controlling and enforcing policy rules on an eUICC includes: setting, by a first external entity, the policy rules through a PCF; and performing, by a second external entity, a PEF for the set policy rules so that the set policy rules are applied to a target profile or the entire eUICC.

According to the exemplary embodiments, a profile owner, for example, a mobile network operator (MNO), a service provider, or the like, may perform a business flow to securely apply a subscription, change, or deletion service through a profile enable, disable, delete, or load function or the like according to policy rules in an eUICC environment in which a plurality of profiles are remotely loaded and appropriately managed.

BRIEF DESCRIPTION OF DRAWINGS

The above and other aspects will become more apparent by describing in detail exemplary embodiments with reference to the accompanying drawings, in which.

DETAILED DESCRIPTION OF THE EXEMPLARY EMBODIMENTS

Figure 1:
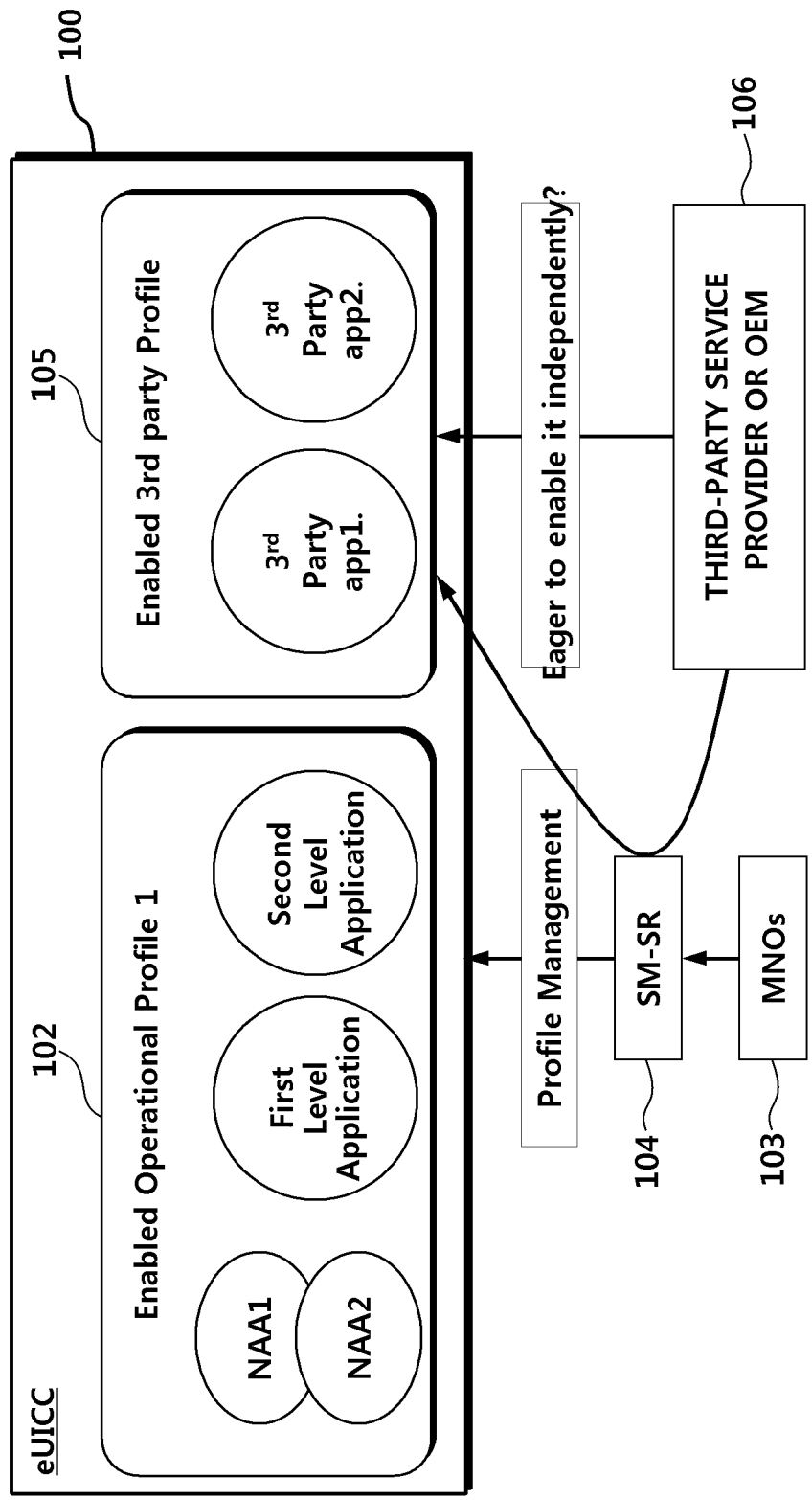
FIG. 1 is an example of a third party profile which is directly managed by a service provider and/or original equipment manufacturer (OEM) according to an exemplary embodiment.

Hereinafter, exemplary embodiments will be described in more detail with reference to the accompanying drawings. In the drawings, the same or similar elements are denoted by the same reference numerals even though they are depicted in different drawings. In the following description of the exemplary embodiments, detailed description of known configurations and functions incorporated herein have been omitted when they may make the subject matter of the exemplary embodiments unclear.

In an embedded SIM (eSIM), which is mounted on a terminal in an integrated type differently from the existing detachable SIM, there are many issues with respect to opening authority, leadership in additional service business, subscriber information security, and the like due to a difference in a physical structure. In order to address this, in the international organizations for standardization, such as Group Special Mobile Association (GSMA) and European Telecommunications Standards Institute (ETSI), standardization activities for necessary elements including a highest architecture are conducted with related companies, such as, a business operator, a manufacturer, and a SIM vendor. In relation to the eSIM which is discussed by the international organizations for standardization, a subscription manager (SM) issues business operator information, for example, an operator credential, to the eSIM. Further, the subscription manager serves as an entity for playing the overall management role for the eSIM, such as, processing of a process for a subscription change or performs a function and operation of the entity.

When a profile, for example, an operational profile, a business operator profile, or a provisioning profile, is remotely managed in this environment, there are principles and requirements for directly implementing and providing policies of a business operator or a service provider who is an owner of the profile, such as, the operational profile, the business operator profile, the provisioning profile, or a third-party profile, and the like in an eSIM environment as well as policies of business requirements in the conventional detachable USIM environment. Hereinafter, the eUICC are used in parallel with the eSIM.

Compared to a detachable USIM in the related art, a plurality of profiles, for example, the operational profile, the business operator profile, the provisioning profile, and the third-party profile, may be present on the eSIM.

However, it is difficult to satisfy the following requirements in this environment.

1. As a first requirement, a mechanism for controlling only one profile to be enabled at any moment is necessary even when there are a plurality of business operator profiles on the eSIM. In relation to this, a function of controlling multiple profiles on the eSIM to be enabled, disabled, loaded, or deleted due to the following situations is necessary. Here, the term "enabled" means that a relevant profile is technically selected.

(A) Fundamentally, a plurality of profiles may be simultaneously loaded to the eSIM. Using the loaded profiles, the service provider which wants a separate service may want to enable the third-party profile along with a communication operator profile. Accordingly, a function capable of controlling the third-party profile is necessary.

[1] The definition of the third-party profile is a profile to be provided by a separate, such as a third-party, service provider which is absent inside of a communication operator profile and equipped with a third-party application.

(B) When a plurality of communication operator profiles are loaded to the eSIM, one or more devices may be needed in order to provide an enabled profile according to characteristics of the terminal and requirements of the communication operator and/or service provider. Therefore, a function of controlling the enabled profile is necessary.

2. As a second requirement, a mechanism for providing an eSIM lock function is necessary (A) A mechanism for locking the eSIM is necessary due to problems such as a subsidy, a stipulated time, and theft. Because the eSIM fundamentally loads a plurality of communication operator profiles through an SM, it may be necessary to manage the lock status of the eSIM.

3. As a third requirement, when the profile on the eSIM is intended to be enabled, disabled, or deleted, a function in which the capability of the eSIM forces the profile to be enabled, disabled, or deleted is necessary.

To solve a problem in the related technology, an exemplary embodiment provides a method of defining the content and structure of policy rules to apply the policy rules. Further, user cases for managing profiles and the eSIM through the policies on the eSIM are provided.

The enable status of the profile refers to a status in which an external entity can select a relevant profile.

As disclosed in the exemplary embodiments, a function of controlling policy rules according to requirements of the business operator and/or service provider for the profiles on the eSIM and an enforcement function of enabling, disabling, loading, or deleting the profiles based on the control policy rules are provided.

Further, as disclosed in the exemplary embodiments, an enforcement function of enabling, disabling, loading, or deleting the profiles according to the policy rules based on the capability on the eSIM is provided.

Additionally, as disclosed in the exemplary embodiments, an enforcement function based on the policy rule such as SIM lock for the profiles on the eSIM according to requirements of the business operator and/or service provider is provided.

FIG. 1 is an example of a third-party profile which is directly managed by a service provider and/or original equipment manufacturer (OEM) according to an exemplary embodiment.

With reference to FIG. 1, the terms associated with the exemplary embodiments will be briefly defined.

A profile may be present on the eUICC 100 or may be one or more combinations of a provisioned file structure, data, and applications.

The provisioning profile is a profile including at least one network access application and associated network access credentials installed in the eUICC 100. The provisioning profile is configured to enable access to a communication network so as to provide transmission capability for managing the eUICC 100 and provide profile management between the eUICC 100 and SM-secure routing (SM-SR) 104.

The operational profile 102 is a profile including at least one network access application and associated network access credentials.

The MNO 103 is an entity for providing customers with a communication service through a mobile network. Here, the MNO may refer to a communication operator, a communication service provider, or the like.

The SM-SR 104 securely performs a function of directly managing the operational profile and the provisioning profile on the eUICC 100.

The third-party profile (or second-party application) 105 refers to a profile which directly passes through the SM-SR or is directly managed (enabled, disabled, deleted, or loaded) by the third-party service provider 106 without authority assignment and/or intervention of the MNO as illustrated in FIG. 1.

Figure 2:
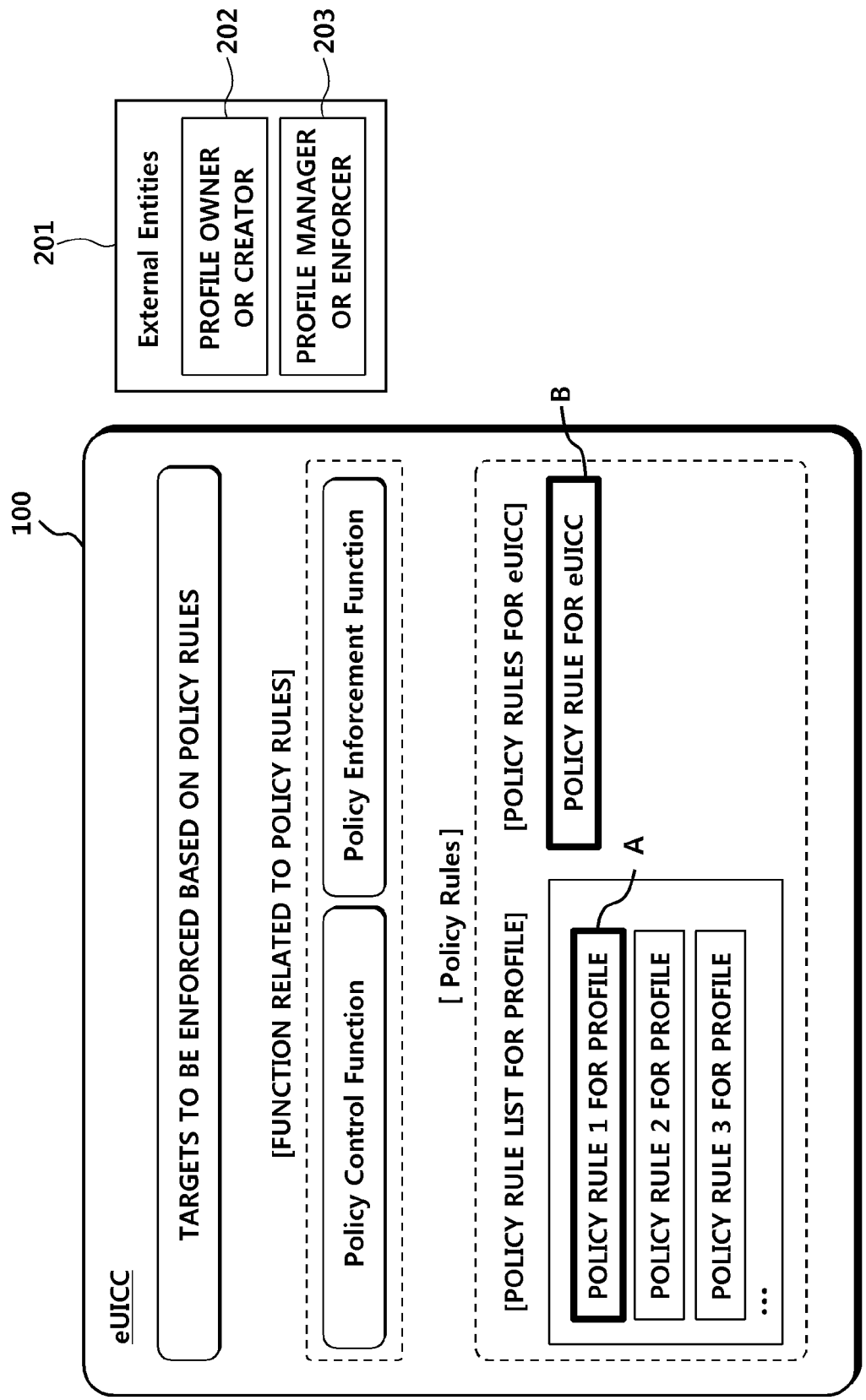
FIG. 2 is a diagram illustrating an architecture for a policy control function (PCF), PCF rules, a policy enforcement function (PEF), and a target for policy rules on an eUICC according to an exemplary embodiment.

FIG. 2 is a diagram illustrating an architecture for a PCF, PCF rules, a PEF, and a target for policy rules on the eUICC 100 according to an exemplary embodiment.

Referring to FIG. 2, a policy rule A indicated by a bold-frame box among the policy rules includes a policy rule(s) associated with a currently enabled profile. In the PEF, only the policy rule(s) associated with the enabled profile may be enforced.

Referring to FIG. 2, the remaining policy rules excluding the policy rule A indicated by the bold-frame box among the policy rules are associated with a profile which is currently disabled in the eUICC 100. In relation to these policy rules, it is difficult to perform the PEF.

Referring to FIG. 2, the policy rules are logically divided into policy rules for a profile, which may also be referred to as policy rules associated with the profile, and policy rules for the eUICC 100, which may also be referred to as policy rules associated with the eUICC 100.

The two types of policy rules may be separately managed in physically different places or files or may be managed in one place or on one file.

Also, the policy rules may be physically present inside and outside of a profile.

Referring to FIG. 2, the profile owner or creator among the external entities is an entity having authority to access and control policy rules for the profile, for example, policy rules associated with the profile, as an entity for generating the profile or a profile master.

Referring to FIG. 2, a profile manager or enforcer 203 among the external entities 201 is an entity having the authority to enforce the management of profiles present on the eUICC 100. Here the management of the profiles may refer to loading, enabling, disabling, deleting, and the like of the profile.

Referring to FIG. 2, the profile owner or creator 202 and the profile manager or enforcer 203 among the external entities 201 may be separate entities or integrated as one entity according to the requirements of the business operator and the service provider.

Also, referring to FIG. 2, these external entities 201 may be servers connected to the eUICC 100 through a network or terminals connected to the eUICC 100 or including the eUICC 100.

On the other hand, the status of the profile on the eUICC 100 may be divided into an enabled status (available status=selectable), a disabled status (unavailable status=not selectable), and a deleted status.

Figure 3:
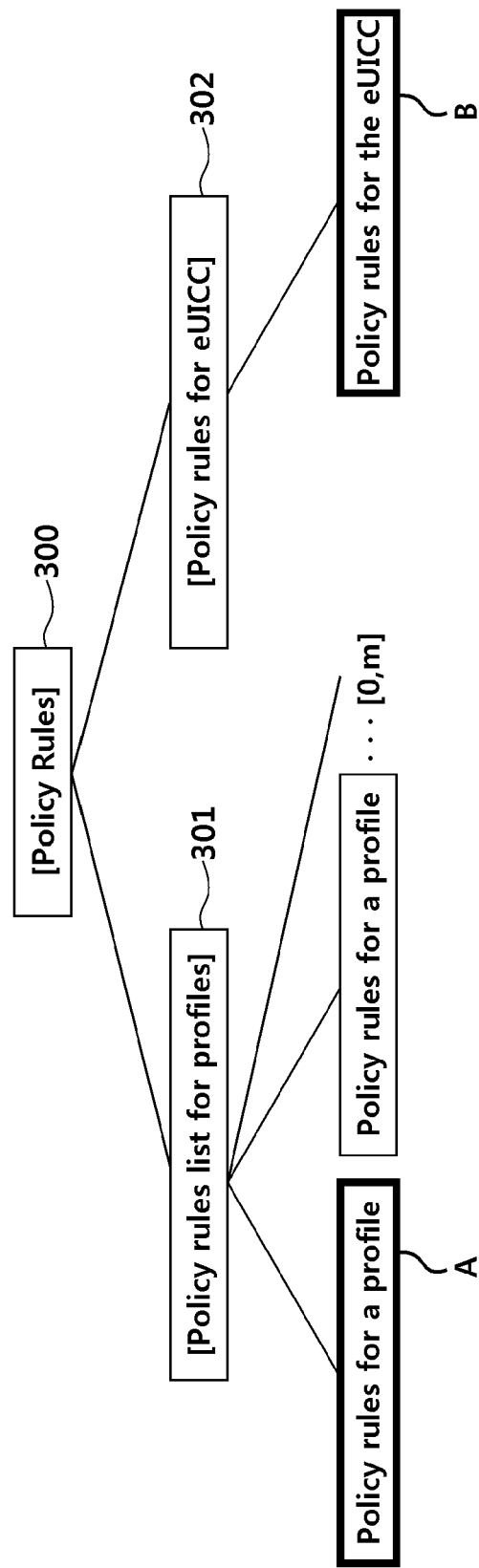
FIG. 3 is a diagram illustrating a logical hierarchy of PCF rules according to an exemplary embodiment.

FIG. 3 is a diagram illustrating logical hierarchy of PCF rules according to an exemplary embodiment.

Referring to FIG. 3, the policy rules 300 may be divided into the policy rules for the profile 301 and the policy rules for the eUICC 302.

Referring to FIG. 3, the number of policy rules 300 for the profile may be 0 or a predetermined maximum value according to the policy rules for the eUICC 302.

A policy is the principle reflecting each entity, for example, an SM) necessary to remotely manage the eUICC 100 and rules for controlling the eUICC 100.

The PEF is a function of executing the policy rules.

Also, the PEF may be a function of evaluating conditions of the policy rules and determining the execution of the commands.

The PCF may define a function of updating or deleting the policy rules for each policy.

Functions, such as the above-described PCF and PEF, may be implemented as functions provided from a platform inside the eUICC 100 or may be newly implemented and provided on the platform.

A PCF list may include the following content. The purpose of execution is important and function names may be changed under the assumption that the purpose is identical. Also, different types of functions may be added.

The execute function maybe be identified as Execute( ): policy rule enforcement. Only policy rules for a profile currently enabled on the eUICC 100 are enforced. A relevant function is not performed for the disabled profile.

A PCF list may include the following content. The purpose of execution is important and function names may be changed under the assumption that the purpose is identical. Also, various types of functions may be added or deleted.

For example, functions such as Add( ) and Update( ) are substantially identical. Only Update( ) is present and Add( ) may be deleted.

Also, for example, control functions such as Read( ) and Select( ) may be added. The functions can be represented as shown below.

Update( ) policy rule value update
Delete( ) policy rule item deletion
Add( ) policy rule item addition
Others Access conditions of external entities for performing a PCF and a PEF may be configured in the format as shown in the following Table 1 which shows the policy rules for the profile, and the following Table 2, which shows the policy rules for the eUICC.

The types of credentials to be used for security conditions for the PCF and the PEF are as follows.

Profile access credentials: data present in a profile so that secure communication is set up between the eUICC 100 and the external entity so as to manage a structure and data of the profile Profile installer credentials: data present in the eUICC 100 so that a profile downloaded from the external entity is deciphered and installed on the eUICC 100

Profile management credentials: data present in the eUICC 100 so that secure communication is set up between the external entity and the eUICC 100 so as to manage the profile on the eUICC 100

TABLE 1

| Target | Function Type | Function List | Credential | Security Condition |
|---|---|---|---|---|
| Profile 1 | Policy Control Function | UpdateDeleteCreate . . . | Profile access credential or Profile Installer Credential | Encryption On/off ‖ Integrity On ‖ Authentication On ‖ 3DES_CBC . . . |
| | Policy Enforcement Function | Execute . . . | Profile management credential | Encryption On/off ‖ Integrity On ‖ Authentication On ‖ RSA1024 . . . |
| . . . | | | | |

TABLE 2

| Target | Function Type | Function List | Credential | Security Condition |
|---|---|---|---|---|
| eUICC | Policy Control Function | UpdateDeleteCreate . . . | Profile access credential or Profile Installer Credential | Encryption On/off \|\| Integrity On \|\| Authentication On \|\| 3DES_CBC . . . |
| | Policy Enforcement Function | Execute . . . | Profile management credential | Encryption On/off \|\| Integrity On \|\| Authentication On \|\| RSA1024 . . . |

Confidentiality, integrity, authentication, and the like are necessary for each function when the PCF and the PEF are to be performed by only an authorized entity.

In performing these functions, confidentiality, integrity, and authentication is determined as a combination of "OR" operations.

For example, function 1 may be confidentiality, function 2 may be a combination of confidentiality‖integrity, and function 3 may be a combination of confidentiality‖integrity‖authentication.

In the PCF, appropriate credentials within the eUICC 100 can be used to satisfy confidentiality, integrity, and authentication.

For example, credentials for this may be profile access credentials or profile installer credentials capable of being issued to an authorized entity, such as a profile owner or a profile creator.

In the PEF, appropriate credentials within the eUICC 100 can be used to satisfy confidentiality, integrity, and authentication.

For example, credentials for this may be profile management credentials capable of being issued to an authorized entity such as a profile manager or a profile enforcer.

The policy rules for the profile will be described below in further detail with reference to Table 3 and the policy rules for the eUICC 100 will be described below in further detail with reference to Table 4.

The policy rules for the profile, for example, policy rules associated with each profile, will be described with reference to Table 3.

TABLE 3

| | Type | Variable | Place |
|---|---|---|---|
| R1 | ID | Profile-specific id | eUICC |
| R2 | | Profile owner id (ex. MNO, Service provider, or the like) | eUICC |
| R3 | | Profile management authorizer id (ex. Profile manager, profile installer, MNO, or the like) | eUICC |
| R4 | Profile management | Information of whether provisioning profile is used when profile is changed | eUICC |
| R5 | | Information of whether profile is allowed to be deleted | eUICC |
| R6 | Profile capabilities | Memory size necessary to enable profile | eUICC |

Table 3 shows an example of a file structure of the policy rules associated with the profile.

Referring to Table 3, the type represents a type of policy rule, the variable represents the type of the policy rule, and the place is a location of the policy rule (eUICC: presence inside eUICC and External Entity: presence outside eUICC).

In Table 3, when the variable is implemented according to content of the policy rule, additional content including the present content may be present. There may be variables which can be selectively used in the present content.

In particular, the policy rule such as "profile management authorizer id" which is R3 is responsible for a function of specifying whether to execute a profile management command such as enabling, disabling, loading, and/or deleting or the like for a relevant profile from an authorized entity or an authenticated entity when the profile management command is executed.

Next, with reference to Table 4, the policy rules for the eUICC 100 will be described.

TABLE 4

| | Type | Variable | Place |
|---|---|---|---|
| R8 | eUICC capabilities | Download/loading-allowed profile ID list | eUICC & external entity |
| R9 | | Number of profiles capable of being enabled | eUICC |
| R10 | | List of IDs of profiles allowed to be enabled | eUICC & external entity |
| R11 | | Information of whether to notify previous profile owner of change after profile change | eUICC |
| R12 | | Memory size allowable for all profiles one UICC | eUICC |
| R13 | | Total number of allowable profiles on eUICC | eUICC |
| R14 | | Memory size necessary to enable profile | eUICC |
| R15 | eUICC lock | eUICC lock status | eUICC |
| R16 | | Effective period of eUICC lock | eUICC |

Table 4 shows an example of a file structure of policy rules associated with the eUICC 100.

Referring to Table 4, the type represents a type of policy rule, the variable represents the type of the policy rule, and the place is a place of the policy rule (eUICC: presence inside eUICC and External Entity: presence outside eUICC).

In Table 4, when the variable is implemented according to content of the policy rule, additional content including the present content may be present. There may be variables which are selectively used in the present content.

Figure 4:
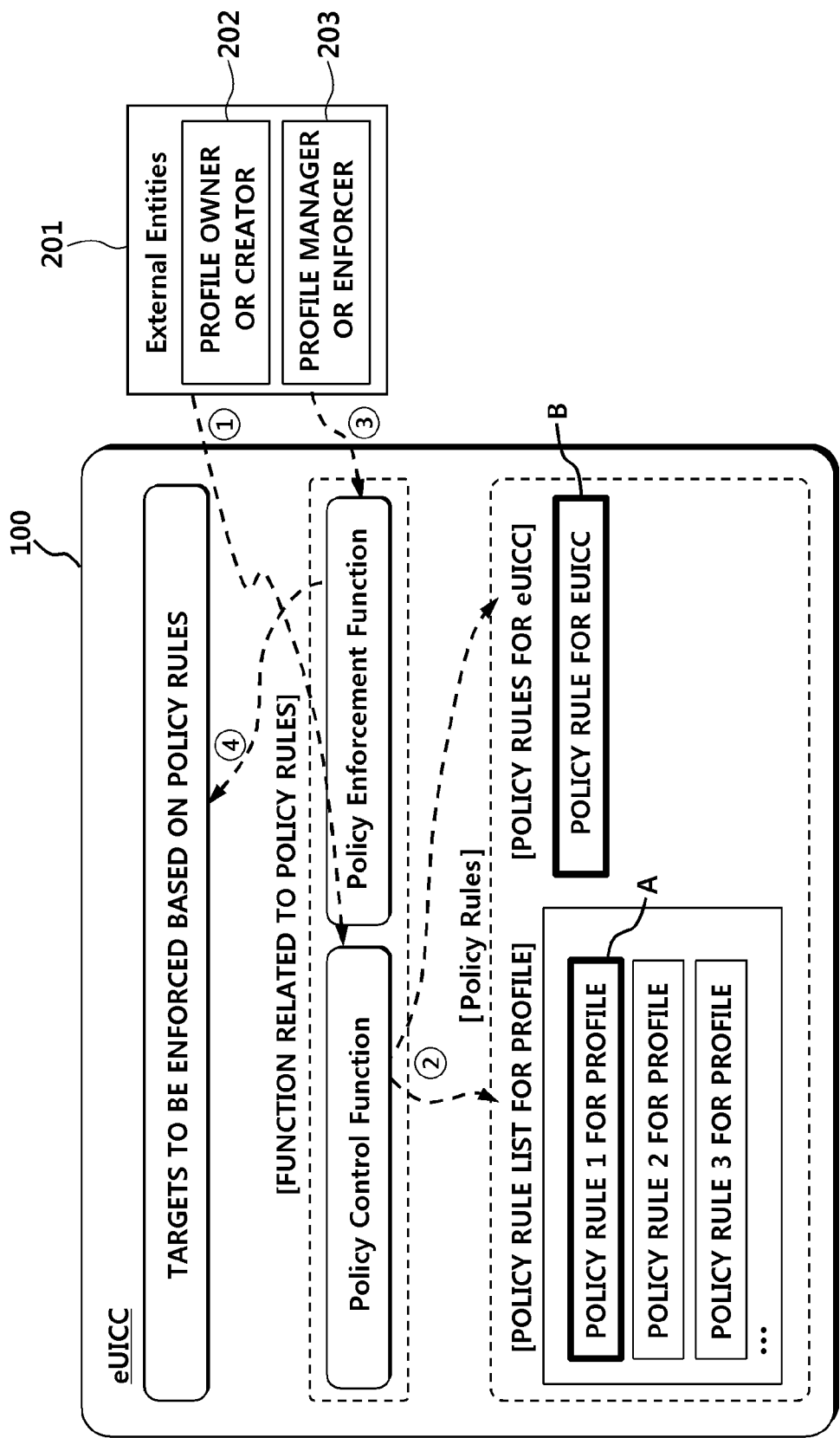
FIG. 4 is a diagram illustrating a basic process of controlling and enforcing policy rules according to an exemplary embodiment.

FIG. 4 is a diagram illustrating a basic process of controlling and enforcing policy rules according to an exemplary embodiment.

Figure 7:
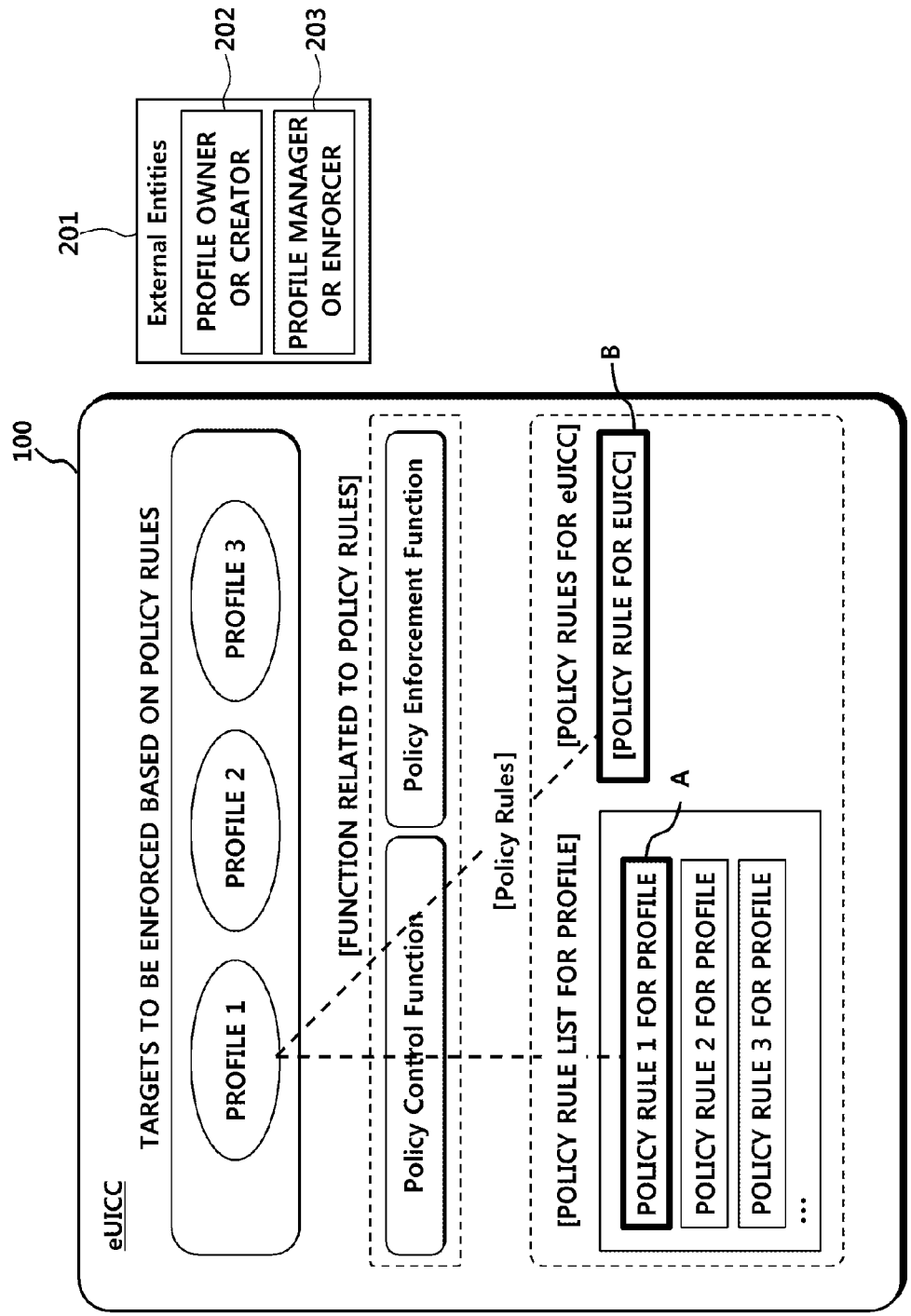
FIG. 7 is a diagram illustrating targets to be executed based on policy rules according to an exemplary embodiment.

In FIG. 4, "targets to be enforced based on policy rules" may be profiles, such as applications or services, in which the actual policies are executed or enforced by the PEF as illustrated in FIG. 7.

Although "targets to be enforced based on policy rules" in FIG. 4 may be profiles (profiles 1, 2, and 3) in which the actual policies are executed or enforced by the PEF as illustrated in FIG. 7, the target may be the eUICC 100 in some cases.

In FIG. 4, the "external entities" may be entities such as an MNO, an SM, and a terminal.

Referring to FIG. 4, a method of controlling and enforcing policy rules according to the exemplary embodiment has the following basic process.

[1] An entity having the authority to control the policy rules of the profile changes, deletes, and/or adds values of policy rules through the PCF. At this time, control may be performed while security is ensured using the credentials as shown in Tables 1 and 2.

[2] In terms of policy rule values, the content of Tables 3 and 4 is set, controlled, updated, deleted, or added through the PCF.

[3] An entity having profile management or enforcement authority performs the PEF (functions within Tables 1 and 2) for policy rules (Tables 3 and 4) which were set in [2].

Figure 5:
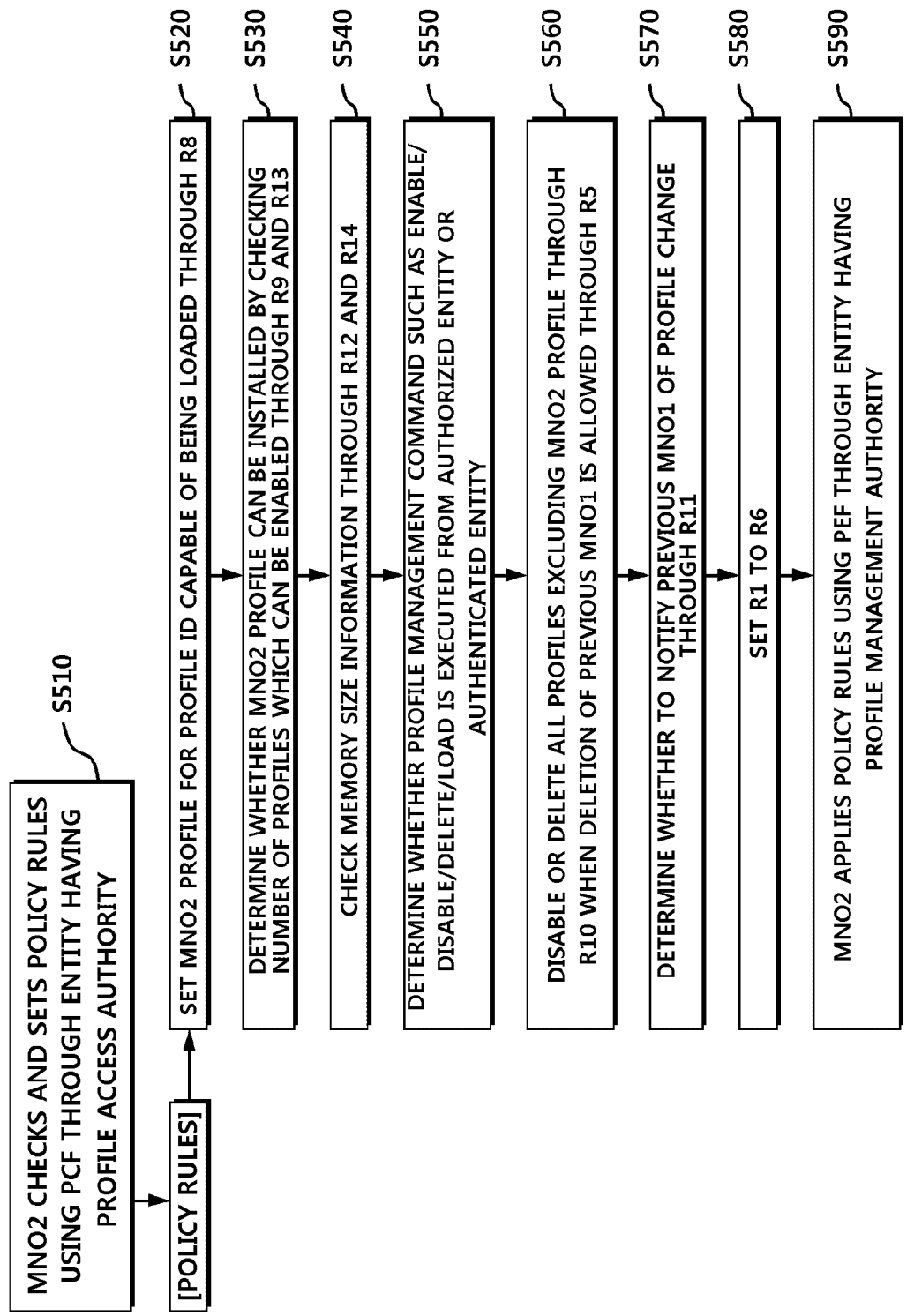
FIGS. 5 and 6 are diagrams illustrating an application process of controlling and enforcing policy rules according to an exemplary embodiment.
Figure 6:
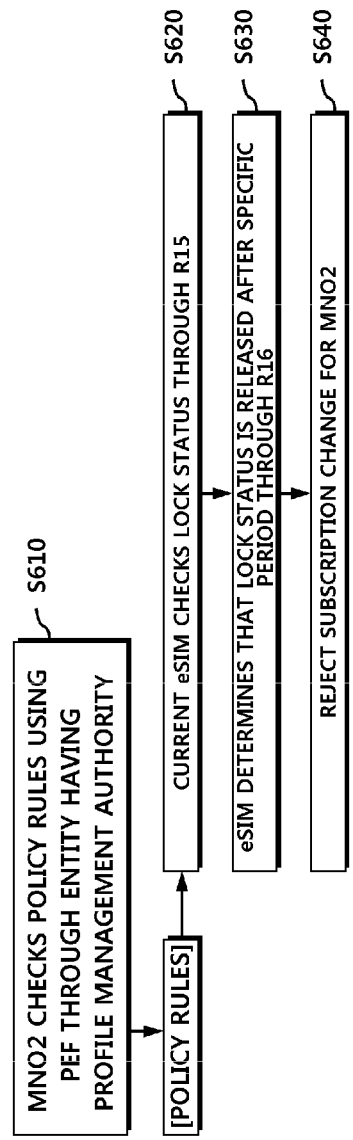

[4] Controlling and enforcing the policy rules which is further described in FIGS. 5 and 6.

FIGS. 5 and 6 are diagrams illustrating an application process of controlling and enforcing the policy rules (an application process of the basic process of FIG. 4) according to an exemplary embodiment.

FIG. 5 illustrates an application process applied to a profile management method by utilizing the method of controlling and enforcing policy rules on the eUICC 100 according to the exemplary embodiment illustrated in FIG. 4 and is a diagram illustrating a procedure in which the policy rules are applied when the profile of the first MNO is currently enabled in the eUICC 100 and a change from the first MNO to a second MNO is attempted.

As shown in FIG. 5, the application process applied to the profile management method may be performed. In step S510, the second MNO checks the policy rules through the PCF using an entity having profile access authority. In step S520, a profile of the second MNO for a loadable profile ID through the policy rule for the eUICC 100 is set. In step S520, a profile of the second MNO for a loadable profile ID through the policy rule R8 among the policy rules for the eUICC 100 is set.

In step S530, it is determined whether the profile of the second MNO can be installed by checking information of the number of profiles which can be enabled and information on the total number of allowable profiles through the policy rules R9 and R13 among the policy rules for the eUICC 100. In step S540, checking information of an allowable memory size for all the profiles and information of a memory size necessary to enable the profile through the policy rules R12 and R14 among the policy rules for the eUICC 100 is performed. In step S550, it is checked whether a profile management command is executed from an authorized entity or an authenticated entity through the policy rule for the eUICC 100.

In step S560, the remaining profiles are disabled or deleted excluding the profile of the second MNO through the policy rule R10 among the policy rules for the eUICC 100 when deletion of a profile of the first MNO is allowed through the policy rule R5. In step S570, it is determined whether the first MNO should be notified of a profile change through the policy rules R11 among the policy rules for the eUICC 100. In step S580 the policy rules R1 to R6 are set for each profile. In step S590, a policy rule set is applied as the PEF through an entity having profile manager authority, and the like.

FIG. 6 illustrates an application process applied to the management of the eUICC 100 by utilizing the method of controlling and enforcing policy rules on the eUICC 100 according to the exemplary embodiment in FIG. 4.

Referring to FIG. 6, when a change from the first MNO to the second MNO is attempted in a situation in which the eUICC is locked, step S610 in which the second MNO checks policy rules as the PCF through an entity having profile access authority is performed. In step S620, it is determined whether the eUICC 100 is locked through the policy rule for the eUICC 100 through the policy rule R15 among the policy rules for the eUICC 100. In step S630, the effective period information of a lock status of the eUICC 100 through the policy rule R16 among the policy rules for the eUICC 100 is checked. In step S640, a subscription change for the second MNO may be rejected, and the like may be performed.

Using the exemplary embodiments, a profile owner, for example, an MNO, a service provider, or the like, may perform the same business flow as a conventional business flow to securely apply a subscription, change, or deletion service through a profile enable, disable, delete, or load function or the like according to policy rules in an environment of the eUICC 100 in which a plurality of profiles are remotely loaded and appropriately managed.

The above-described method of controlling and enforcing policy rules according to the exemplary embodiments will be summarized and described below.

FIG. 7 is a diagram illustrating targets to be executed based on policy rules according to an exemplary embodiment.

Figure 8:
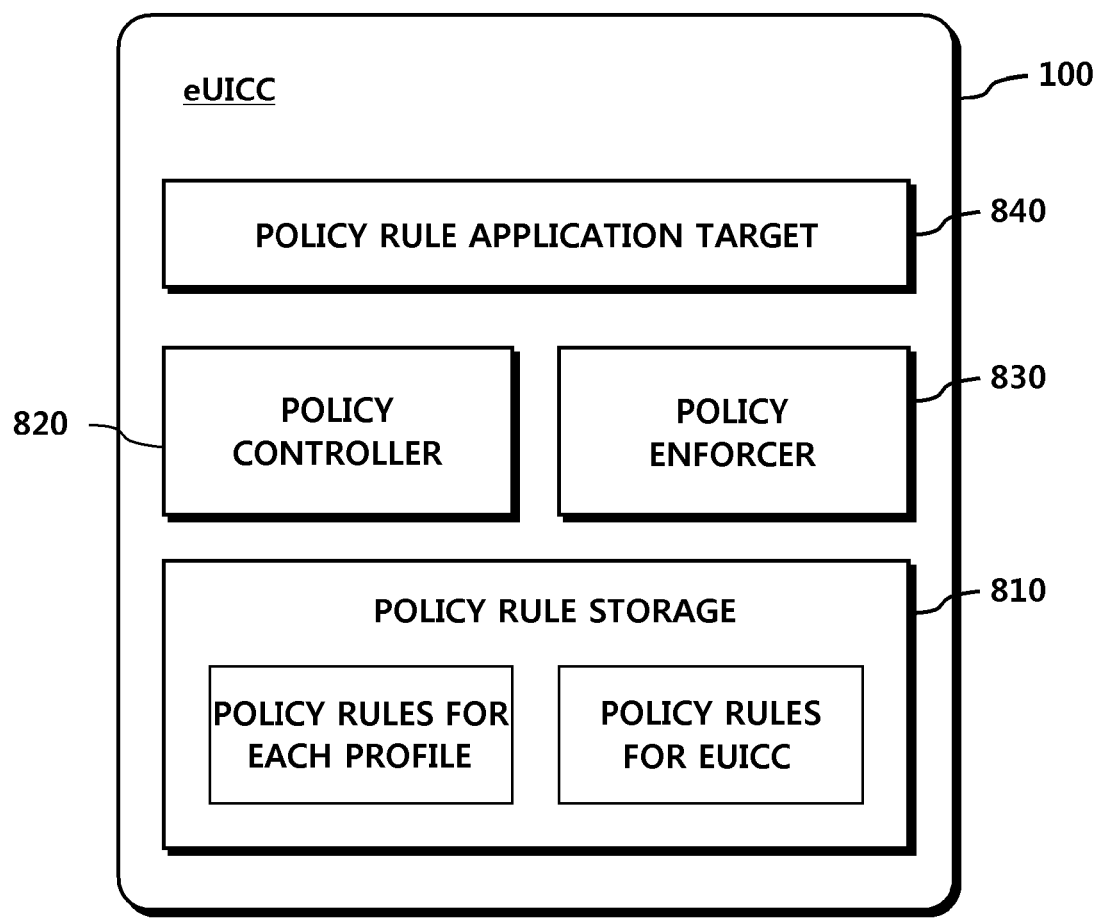
FIG. 8 is a block diagram illustrating an eUICC for controlling and enforcing policy rules according to an exemplary embodiment.

FIG. 8 is a block diagram illustrating the eUICC 100 for controlling and enforcing policy rules according to an exemplary embodiment.

Referring to FIG. 8, the eUICC 100 for controlling and enforcing policy rules includes a policy rule storage 810 configured to define actions and conditions required to enforce policies and store policy rules including policy rules for each profile and policy rules for the eUICC 100. The eUICC 100 also includes a policy controller 820 which is configured to define, update, or delete the policy rules, and a policy enforcer 830 which is configured to enforce the policy rules, and the like.

The policy controller 820 may be configured to perform the PCF and the policy enforcer 830 may be configured to perform the PEF.

The above-described policy rules for each profile may include policy rules associated with a profile enabled in the eUICC 100.

Also, the policy rules for each profile further include one or more policy rules associated with a profile disabled in the eUICC 100.

Here, the policy rules associated with the enabled profile can be enforced by the policy enforcer 830, but the policy rules associated with the disabled profile cannot be enforced by the policy enforcer 830.

The policy enforcer 830 may evaluate conditions of the policy rules and determine execution of commands based on the evaluation.

On the other hand, credentials for use in security conditions for the policy enforcer 830 and the policy controller 820, for example, may include one or more of a profile access credential, a profile installer credential, and a profile management credential.

The policy rules for each profile and the policy rules for the eUICC 100 may be a file structure having one or more of a type of policy rule, a variable representing the type of policy rule, and a place in which the policy rule is present, as shown in Tables 3 and 4.

On the other hand, for example, as shown in Table 3, a policy rule list for each profile may include one or more of the policy rule R1 including a profile-specific identifier (ID), the policy rule R2 having a profile owner ID as a variable, the policy rule R3 having a profile management authorizer ID as a variable, the policy rule R4 which has a profile management type and has information as to whether a provisioning profile is used at the time of a profile change as a variable, the policy rule R5 having information of whether profile deletion is allowed as a variable, and the policy rule R6 of which a type is profile capabilities and having memory size information necessary for enabling the profile.

Here, the policy rule R3 which has the profile management authorizer ID as the variable may have a function of specifying whether a profile management command of one of enabling, disabling, loading, and deleting for a relevant profile is executed from an authorized entity or an authenticated entity when the profile management command is executed.

In addition, the policy rule R3 having the profile management authorizer ID as the variable, for example, may be the policy rule for permitting only one selected SM to access the eUICC.

In addition, the policy rules associated with each profile, for example, may include a policy rule for defining permitted service names for owner authentication and may be the policy rule R2 having the profile owner ID among the above-described policy rules as the variable.

On the other hand, for example, as shown in Table 4, a policy rule list for the eUICC 100 may include one or more of the policy rule R8 of which a type is eUICC capabilities and has a download and loading-allowed profile ID list as a variable, the policy rule R9 having information of the number of profiles capable of being enabled as a variable, the policy rule R10 having information of an ID list of profiles which can be enabled as a variable, the policy rule R11 having information of whether to notify a previous profile owner of a change after a profile change as a variable, the policy rule R12 having information of an allowable memory size for all profiles on the eUICC as a variable, the policy rule R13 having information of the total number of allowable profiles on the eUICC 100 as a variable, the policy rule R14 having information of a memory size necessary to enable the profile as a variable, the policy rule R15 of which a type is eUICC lock and having an eUICC lock status as a variable, and the policy rule R16 having effective period information of the eUICC lock as a variable.

Among the above-described policy rules, the policy rule R11 having the information as to whether to notify the previous profile owner of the change after the profile change as the variable may be a policy rule for determining that the eUICC 100 can provide the notification of the change in the profile status.

Figure 9:
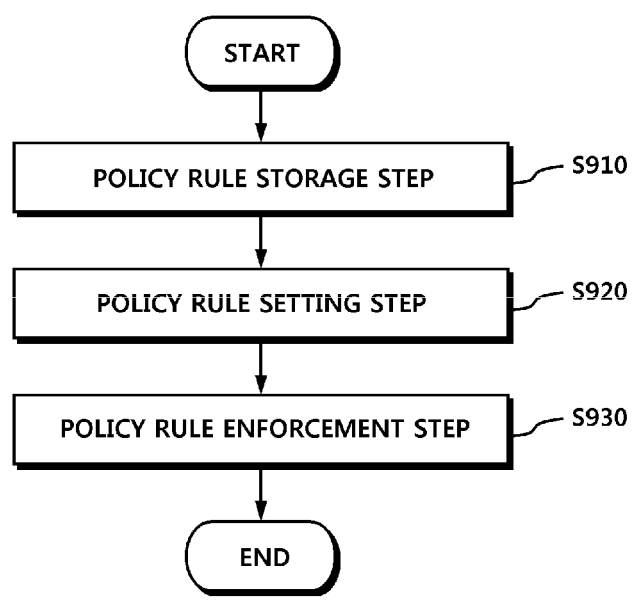
FIG. 9 is a flowchart illustrating a method of controlling and enforcing policy rules according to an exemplary embodiment.

FIG. 9 is a flowchart illustrating a method of controlling and enforcing policy rules according to an exemplary embodiment.

Referring to FIG. 9, a method of controlling and enforcing policy rules on the eUICC 100 is disclosed. In step S910, the eUICC 100 defines actions and conditions required to enforce policies and stores policy rules including "policy rules for each profile" and "policy rules for the eUICC 100." In step S920, the eUICC 100 sets the policy rules through a PCF. In step S930, the eUICC 100 enforces the set policy rules through the PCF.

Figure 10:
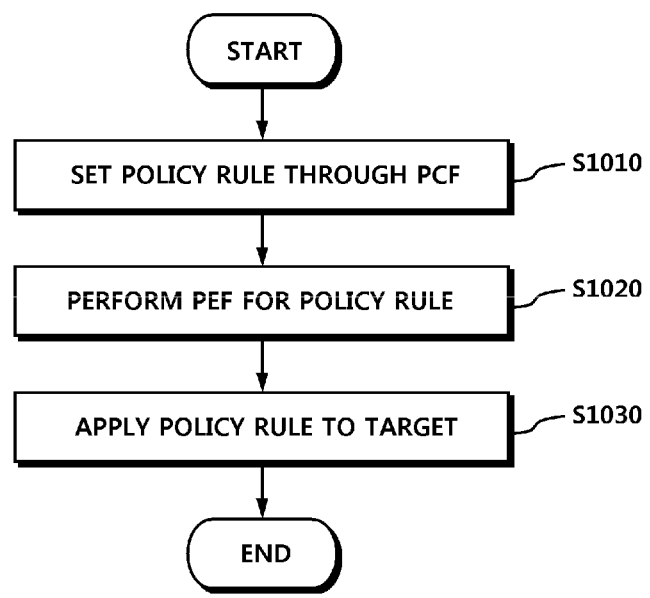
FIG. 10 is a flowchart illustrating a method of controlling and enforcing policy rules according to an exemplary embodiment.

FIG. 10 is another flowchart illustrating a method of controlling and enforcing policy rules according to an exemplary embodiment.

Referring to FIG. 10, the method of controlling and enforcing policy rules on the eUICC 100 according to the exemplary embodiment is disclosed. In step S1010, a first external entity sets the policy rules through a PCF. In step S1020, a second external entity performs a PEF for the set policy rules so that the set policy rules are applied to a target profile or the entire eUICC 100. In step S1030, the set policy rules are applied to the target file and the entire eUICC 100, and the like. Here, the first and second external entities may be the same or different from each other In the above-described step S1010, security is ensured based on a predefined credential for the PCF when the policy rules are set through the PCF.

The method of controlling and enforcing the policy rules on the eUICC 100 according to the exemplary embodiments described above may be utilized and applied to a profile management method.

As an example of a profile management method, a procedure in which the policy rules are applied may be the same as that illustrated in FIG. 5 when the profile of the first MNO is currently enabled in the eUICC 100 and a change from the first MNO to a second MNO is attempted.

Referring to FIG. 5, step S1020 in FIG. 10 includes step S510 in which the second MNO checks the policy rules through the PCF using an entity having profile access authority, step S520 of setting a profile of the second MNO for a loadable profile ID through the policy rule for the eUICC 100, step S530 of determining whether the profile of the second MNO can be installed by checking information of the number of profiles capable of being enabled and information of the total number of allowable profiles through the policy rule for the eUICC 100, step S540 of checking information of an allowable memory size for all the profiles and information of a memory size necessary to enable the profile through the policy rule for the eUICC 100, step S550 of checking whether a profile management command is executed from an authorized entity or an authenticated entity through the policy rule for the eUICC 100, step S560 of disabling or deleting the remaining profiles excluding the profile of the second MNO through the policy rule for the eUICC 100 when deletion of a profile of the first MNO is allowed through the policy rules for each profile, step S570 of determining whether to notify the first MNO of a profile change through the policy rules for the eUICC 100, and step S580 of setting the policy rules for each profile, and the like.

When step S1010 of FIG. 10 is performed to include steps S510, S520, S530, S540, S550, S560, S570, and S580 of FIG. 5, the second MNO may apply the policy rules set as the PEF through the entity having the profile manager authority in step S1020 of FIG. 10.

On the other hand, the method of controlling and enforcing policy rules on the eUICC 100 according to the exemplary embodiment described above with reference to FIG. 10 may be utilized and applied to the management of the eUICC 100.

As an example of this case, when a change from the first MNO to the second MNO is attempted in a situation in which the eUICC is locked, step S1010 of FIG. 10 includes step S610 of checking, by the second MNO, policy rules as the PCF through an entity having profile access authority, step S620 of determining whether the eUICC 100 is locked through the policy rule for the eUICC 100, step S630 of checking effective period information of a lock status of the eUICC 100 through the policy rule for the eUICC 100, and step S640 of rejecting a subscription change for the second MNO as in FIG. 6.

In the exemplary embodiments described above, a function of controlling (for example, defining, setting, updating, and the like) policy rules for profiles on the eUICC according to requirements of a business operator or service provider may be provided and an enforcement function of enabling, disabling, loading, or deleting the profiles based on the policy rules controlled in this manner may be provided.

Using the exemplary embodiments, a profile owner (for example, an MNO, a service provider, or the like) may perform the same business flow as a conventional business flow to securely apply a subscription, change, or deletion service through a profile enable, disable, delete, or load function or the like according to policy rules in an environment of the eUICC 100 in which a plurality of profiles must be remotely loaded and appropriately managed. The exemplary embodiments can be recorded as programs that can be executed on a computer and be implemented through general-use digital computers that execute the programs using a computer-readable recording medium.

Examples of the computer-readable recording medium include magnetic storage media (e.g., ROM, floppy disks, hard disks, etc.), optical recording media (e.g., CD-ROMs or DVDs), carrier waves (e. g., transmission through the Internet), etc.

The exemplary embodiments have been described above. It will be appreciated by those skilled in the art that various modifications and alterations can be made without departing from the essential characteristics of the exemplary embodiments. Accordingly, the exemplary embodiments which are disclosed are used not to limit but to describe the spirit of the exemplary embodiments. The scope of the exemplary embodiments should be defined by the following claims rather than the above-mentioned description, and all technical spirits equivalent to the following claims should be interpreted as being included in the exemplary embodiments.

What is claimed is:

1. An embedded universal integrated circuit card (eUICC) configured to control and enforce policy rules, the eUICC comprising:
   a policy rule storage configured to define actions and conditions required to enforce a plurality of policies and store a plurality of policy rules including a plurality of policy rules for each profile and a plurality of policy rules for the eUICC;
   a policy controller configured to control the plurality of policy rules; and
   a policy enforcer configured to enforce the plurality of policy rules,
   wherein, when a change from a first mobile network operator (MNO) to a second MNO is attempted, the policy controller is configured to perform:
      setting a profile of the second MNO for a loadable profile ID through a policy rule for the eUICC;
      in response to determining that the eUICC is locked, checking effective period information of a lock status of the eUICC through the policy rule for the eUICC; and
      rejecting a subscription change for the second MNO in response to a result of the checking.

2. The eUICC of claim 1, wherein the plurality of policy rules for each profile comprises a policy rule associated with a profile which is enabled in the eUICC.

3. The eUICC of claim 2, wherein the plurality of policy rules for each profile further comprises one or more policy rules associated with a profile which is disabled in the eUICC.

4. The eUICC of claim 3, wherein the policy rule associated with the enabled profile can be enforced by the policy enforcer, and wherein the policy rule associated with the disabled profile cannot be enforced by the policy enforcer.

5. The eUICC of claim 1, wherein the policy enforcer is configured to evaluate conditions of the policy rules and configured to determine execution of a command based on the evaluation.

6. The eUICC of claim 1, wherein credentials used in security conditions for the policy enforcer and the policy controller comprise one or more of a profile access credential, a profile installer credential, and a profile management credential.

7. The eUICC of claim 1, wherein the policy rules for each profile and the policy rules for the eUICC comprise a file structure having one or more of a type of policy rule, a variable representing the type of the policy rule, and a location in which the policy rule is located.

8. The eUICC of claim 1, wherein a policy rule list for each profile comprises at least one of a policy rule including a unique profile identifier (ID), a policy rule having a profile owner ID as a variable, a policy rule having a profile management authorizer ID as the variable, a policy rule which has a profile management type and has information as to whether a provisioning profile is used at a time of a profile change as the variable, a policy rule having information as to whether profile deletion is allowed as the variable, and a policy rule which has a profile capabilities type and has memory size information for enabling the profile as the variable.

9. The eUICC of claim 8, wherein the policy rule which has the profile management authorizer ID as the variable is configured to specify whether a profile management command including at least one of enabling, disabling, loading, and deleting a relevant profile is executed from an authorized entity or an authenticated entity when the profile management command is executed.

10. The eUICC of claim 1, wherein a policy rule list for the eUICC profile comprises at least one of a policy rule which has a type of eUICC capabilities and has a download and loading-allowed profile ID list as a variable, a policy rule which has information of a number of profiles which can be enabled as the variable, a policy rule which has information of an ID list of profiles which can be enabled as the variable, a policy rule which has information as to whether to notify a previous profile owner of a change after a profile change as the variable, a policy rule which has information of an allowable memory size for all profiles on the eUICC as the variable, a policy rule which has information of a total number of allowable profiles on the eUICC as the variable, a policy rule which has information of a memory size to enable the profile as the variable, a policy rule which has a type of eUICC lock and which has an eUICC lock status as the variable, and a policy rule which has the effective period information of the eUICC lock as the variable.

11. A method of controlling and enforcing policy rules on an embedded universal integrated circuit card (eUICC), the method comprising:
   defining, by the eUICC, actions and conditions in order to enforce policies and storing policy rules including policy rules for each profile and policy rules for the eUICC;
   setting, by the eUICC, the policy rules through a policy control function (PCF); and
   enforcing, by the eUICC, the set policy rules through a policy enforcement function (PEF), wherein, when a change from a first mobile network operator (MNO) to a second MNO is attempted, the setting comprises:
  setting a profile of the second MNO for a loadable profile ID through a policy rule for the eUICC;
  in response to determining that the eUICC is locked, checking effective period information of a lock status of the eUICC through the policy rule for the eUICC; and
  rejecting a subscription change for the second MNO in response to a result of the checking.

12. A method of controlling and enforcing policy rules on an embedded universal integrated circuit card (eUICC), the method comprising:
  setting, by a first external entity, the policy rules through a policy control function (PCF) provided on the eUICC; and
  performing, by a second external entity, a policy enforcement function (PEF), provided on the eUICC, for the set policy rules so that the set policy rules are applied to at least one of a target profile and the entire eUICC,
  wherein, when a change from a first mobile network operator (MNO) to a second MNO is attempted, the setting comprises:
    setting a profile of the second MNO for a loadable profile ID through a policy rule for the eUICC;
    in response to determining that the eUICC is locked, checking effective period information of a lock status of the eUICC through the policy rule for the eUICC; and
    rejecting a subscription change for the second MNO in response to a result of the checking.

13. The method of claim 12, wherein, in the setting, security is ensured based on a predefined credential for the PCF when the policy rules are set for the PCF.

14. A method of controlling and enforcing policy rules on an embedded universal integrated circuit card (eUICC), the method comprising:
  setting, by a first external entity, the policy rules through a policy control function (PCF); and
  performing, by a second external entity, a policy enforcement function (PEF) for the set policy rules so that the set policy rules are applied to at least one of a target profile and the entire eUICC,
  wherein, when a change from a first mobile network operator (MNO) to a second MNO is attempted, the setting the policy rules comprises:
    checking, by the second MNO, the policy rules through the PCF using an entity having profile access authority;
    setting a profile of the second MNO for a loadable profile ID through a policy rule for the eUICC;
    determining whether the profile of the second MNO can be installed by checking information of a number of profiles which can be enabled and information of a total number of allowable profiles through the policy rule for the eUICC;
    checking information of an allowable memory size for all of the profiles and information of a memory size to enable the profile through the policy rule for the eUICC;
    checking whether a profile management command is executed from an authorized entity or an authenticated entity through the policy rule for the eUICC;
    disabling or deleting remaining profiles excluding the profile of the second MNO through the policy rule for the eUICC when deletion of a profile of the first MNO is allowed through the policy rules for each profile; and
    determining whether to notify the first MNO of a profile change through the policy rule for the eUICC, and
  setting the policy rules for each profile,
  wherein the performing the PEF comprises applying, by the second MNO, the set policy rule as the PEF through an entity having profile manager authority.

15. The method of claim 14, wherein, when a change from the first MNO to the second MNO is attempted in a situation in which the eUICC is locked, the setting a profile of the second MNO comprises:
  checking, by the second MNO, policy rules as the PCF through an entity having profile access authority;
  determining whether the eUICC is locked through the policy rule for the eUICC;
  checking effective period information of a lock status of the eUICC through the policy rule for the eUICC; and
  rejecting a subscription change for the second MNO.

16. The eUICC according to claim 1, wherein the policy controller is configured to perform at least one of defining, updating, or deleting the policy rules.

17. The eUICC according to claim 1, wherein the policy controller is configured to perform a policy control function (PCF).

18. The eUICC according to claim 1, wherein the policy enforcer is configured to perform a policy enforcement function (PEF).

19. The eUICC of claim 1, wherein, when the change from the first MNO to the second MNO is attempted, the policy controller is further configured to perform:
  determining whether the profile of the second MNO is installable by checking information of a number of profiles which can be enabled and information of a total number of allowable profiles through the policy rule for the eUICC;
  checking information of an allowable memory size for all of the profiles and information of a memory size to enable the profile through the policy rule for the eUICC;
  checking whether a profile management command is executed from an authorized entity or an authenticated entity through the policy rule for the eUICC; and
  determining whether to notify the first MNO of a profile change through the policy rule for the eUICC.

* * * * *